(12) United States Patent
Andrew et al.

(10) Patent No.: US 6,259,819 B1
(45) Date of Patent: Jul. 10, 2001

(54) EFFICIENT METHOD OF IMAGE COMPRESSION COMPRISING A LOW RESOLUTION IMAGE IN THE BIT STREAM

(75) Inventors: James Philip Andrew, Waverton; Linda Chen, Epping, both of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/055,316

(22) Filed: Apr. 6, 1998

(30) Foreign Application Priority Data

Apr. 4, 1997 (AU) .................................................. PO6008

(51) Int. Cl.⁷ ................................. G06K 9/36; G06K 9/46
(52) U.S. Cl. .......................... 382/248; 382/240; 382/247; 382/166
(58) Field of Search .................................... 382/162, 166, 382/167, 240, 247, 250, 251, 299, 248

(56) References Cited

U.S. PATENT DOCUMENTS

| | | | |
|---|---|---|---|
| 5,563,960 | * 10/1996 | Shapiro | 382/239 |
| 5,739,920 | * 4/1998 | Nakajima et al. | 358/426 |
| 5,748,786 | * 5/1998 | Zandi et al. | 382/240 |
| 5,880,856 | * 3/1999 | Ferriere | 358/432 |
| 5,982,938 | * 11/1999 | Dube | 382/240 |

OTHER PUBLICATIONS

"Coding of Still Pictures", Boliek et al., ISO/IEC JTC 1/SC 29/WG 1, Jun. 30, 1995.

* cited by examiner

*Primary Examiner*—Phuoc Tran
(74) *Attorney, Agent, or Firm*—Fitzpatrick, Cella, Harper & Scinto

(57) ABSTRACT

A method of providing a thumbnail-size colour digital image in a bit stream of a larger size colour digital image is disclosed. The bit stream of the larger digital image is typically in a compressed format, and includes a thumbnail size image in a substantially uncompressed format. The method includes converting input colour values of the larger colour image from a first colour format to corresponding values in a Luminance, Chrominance-blue, Chrominance-red (Y,Cb,Cr) colour format, A transform is then applied to said corresponding values to decompose the larger digital image into a DC subband and one or more higher frequency subbands. Typically the transform is a discrete wavelet transform. The DC subband is then output to the bit stream in an uncompressed format. Then at least one of the one or more higher frequency subbands is encoded into the bit stream in a substantially compressed format. The DC subband thus represents a thumbnail-size colour digital image in the bit stream.

53 Claims, 14 Drawing Sheets

EFFICIENT METHOD OF IMAGE COMPRESSION COMPRISING A LOW RESOLUTION IMAGE IN THE BIT STREAM

FIELD OF THE INVENTION

The present invention relates to compression of digital image data and in particular to a method of encoding a raw bitmap of a low resolution version of an original image directly into a compressed bit stream. Further, encoding a raw bitmap into the pressed bit stream is achieved without substantially affecting the compression efficiency or computational efficiency of the compression and/or decompression of the digital image.

BACKGROUND ART

In general, digital age compression comprises encoding an entire image, either as a whole or in a block-wise manner, to produce a bit-stream of data representing the image. Often the size, measured in bits, of the bit-stream representing the image is reduced, by the compression process, when compared with the number of bits required to represent the digital image in an uncompressed format.

An advantage of compressing a digital image is that a compressed digital image data physically occupies less storage space on a storage device (eg. RAM, Disk or Magnetic Tape storage). Another advantage lies in a transmission of the digital images; a reduced bit-stream, typically as a result of compression, requires less transmission time than does the transmission of the digital image in an uncompressed format. At least one drawback of storing or transmitting a digital image in a compressed format is that the compressed image requires processing or decompressing before it can be displayed on a display device. Consequently, a compressed digit image cannot be displayed without investing costly time to decompress the compressed image. When browsing through a multitude of images, which are stored in a storage device or transmitted to a user in compressed format, having to decompress each image and display the image to find a select one of the images can pose a difficulty. In particular, the processing time required to decompress each image can render the browsing slow and cumbersome.

A number of hierarchical techniques for image coding are known which involve coding a lower resolution version of an image within a bit stream of a higher resolution version of the image. However, to display the lower resolution version of an image the compressed image or coded bit stream must be decoded. Typically the lower resolution version of an image can not be gleaned off the coded bit stream in a form substantially ready for display without decoding the entire, or part of the image. Further, with many of the known techniques, a low resolution version of an image in an uncoded format (ie. a format substantially ready for display) cannot be embedded in a bit stream of a coded higher resolution version of the image without substantially affecting the compression efficiency, computational efficiency or decoding complexity.

In addition, for known techniques where a first (low resolution) image is stored together with a second (high resolution) image, the first image typically being a small size likeness of the second image, the first image generally duplicates information already inherent in the second image. For example, a digital image can be duplicated and the duplicate image sub-sampled to provide a small likeness (lower resolution) of the digital image. The digital image is compressed and the small duplicate likeness can be stored in an uncompressed format together with the compressed digital image. The small duplicate likeness of the digital image makes available a representation of the digital image readily displayable on a display device without a requirement to decompress the entire digital image. However in current techniques the small duplicate likeness of the digital image is typically stored as an independent stream of data and not as an uncompressed portion of a digital image. Thus with the known techniques, at least, some disadvantages lie in a requirement to store duplicate information inherent to a digital image, which reduces the compression efficiency.

SUMMARY OF THE INVENTION

In accordance with a first aspect of the present invention there is disclosed a method of providing a thumbnail-size colour digital image in a bit stream of a larger size colour digital image, the bit stream of the larger digital image being in a compressed format, and comprising a thumbnail size image in a substantially uncompressed format, the method comprising the steps of:

converting input colour values of the larger colour image from a first colour format to corresponding values in a Luminance, Chrominance-blue, Chrominance-red (Y,Cb,Cr) colour format;

applying a transform to the corresponding values to decompose the larger digital image into a DC subband and one or more higher frequency subbands;

outputting to the bit stream the DC subband in an uncompressed format; and encoding at least one of the one or more higher frequency subbands into the bit stream in a substantially compressed format, wherein the DC subband represents the thumbnail-size colour digital image in the bit stream, In accordance with a second aspect of the present invention there is disclosed a method of compressing a digital image, the digital image comprising pixels represented in primary colour red, green and blue (RG) format, the method comprising the steps of:

converting R, G and B components of the pixels from the RGB format to components in Luminance, Chrominance-Blue, Chrominance-Red (YCbCr) format, the converting including sub-sampling of the Cb and Cr components;

decomposing using non-integer based processing each YCbCr component of the pixels of the digital image into a DC subband and a plurality of higher frequency subbands;

encoding into a bit stream the DC subband for each component as a substantially uncompressed raw bitmap image; and encoding into the bit stream the plurality of high frequency subbands as a compressed bitmap image.

In accordance with a third aspect of the present invention there is disclosed a method of compressing a digital image, the dig image comprising pixels represented in primary colour (RGB) format, the method comprising the steps of:

converting the pixels from the RGB format to Luminance, Chrominance-Blue, Chrominance-Red (YCbCr) component format;

decomposing using a non-integer based discrete wavelet transform each component of the YCbCr format of the digital image into a DC subband and a plurality is of higher frequency subbands;

converting the DC subband into RGB format;

encoding into a bit stream tee convened DC subband for each primary colour as a substantially uncompressed raw bitmap image; and encoding into the bit stream the plurality of high frequency subbands as a compressed bitmap image A number of other aspects of the invention including apparatus configured to perform one or more of the methods and corresponding computer readable media are also disclosed.

BRIEF DESCRIPTION OF THE DRAWINGS

Embodiments of the present invention will now be described with reference to the drawings, in which.

DETAILED DESCRIPTION OF THE EMBODIMENTS

Figure 1:
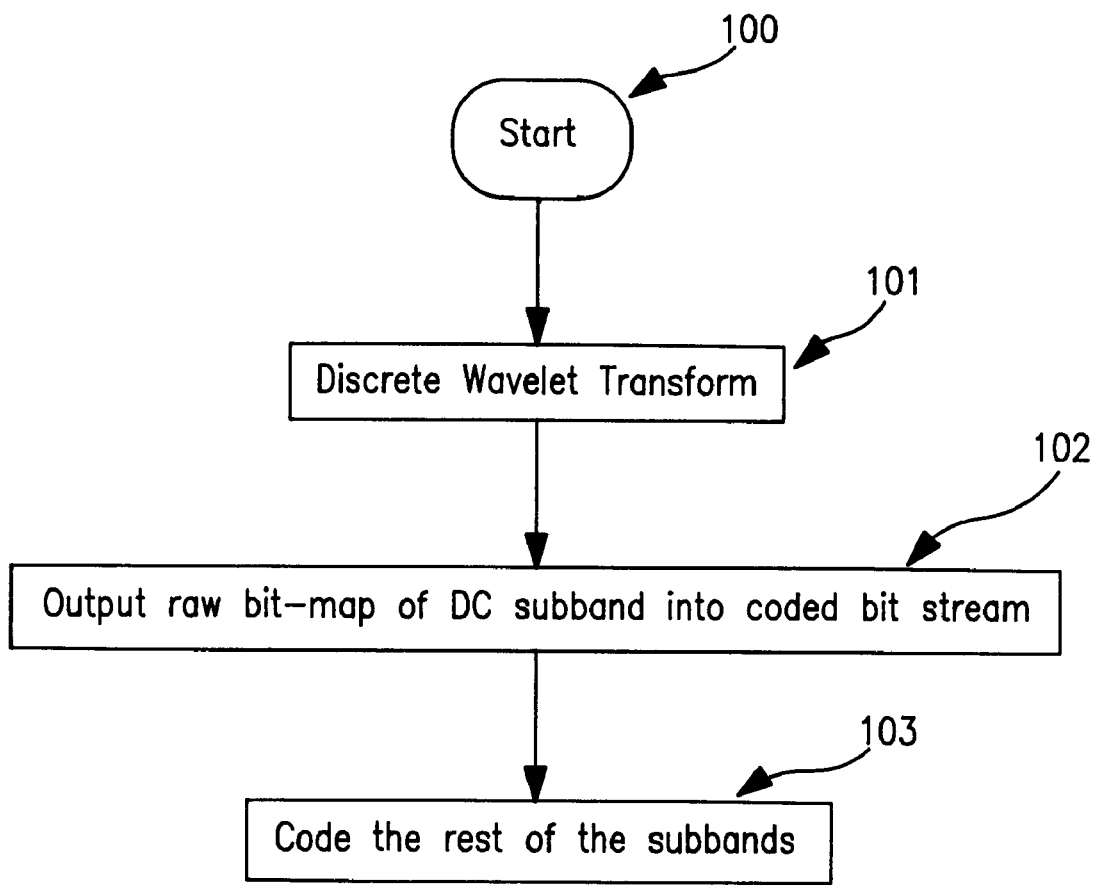
FIG. 1. shows a high level block diagram representing an overview of the embodiment of the present invention.

Referring to FIG. 1 there is shown a high-level block diagram to provide an overview of the embodiments of the present invention. At a starting point 100 of the high-level block diagram a digital image is subject to a hierarchical subband decoding process 101 to produce a plurality of frequency subbands of the image. For example, an 8 bit (grey scale) 512×512 pixel digital image is transformed using a 4-level discrete wavelet transform, or an octave band filter bank, to produce a 32×32 pixel lowest frequency subband, commonly referred to as a DC subband, and a plurality of higher frequency subbands. A next step 102 in the high-level block diagram is to output, as part of a bit-stream representation of the image, the DC (or lowest frequency) subband as a raw bitmap.

Preferably, the transform used is a non-integer based transform, or an integer-based transform where the DC subband has a different precision to that of the input image. Such transforms offer better low-pass filtering, and hence improved visual results, as well as better compression performance than integer-based transforms whose DC subband has the same precision as the input.

Throughout this specification, unless otherwise noted, a reference to "raw bitmap" is to be construed as a reference to pixel based image data represented in a form substantially ready (or with a minimal processing) for display on a display device. A raw bitmap is also often referred to as an uncompressed format. For example, a raw bitmap can include pixel image data represented as R,G,B values which is readily adaptable for display on a device such as a cathode ray tube (CRT). Optionally, a taw bitmap can be of a form readily displayable on a printer device such a high quality colour printer.

The high frequency subbands are encoded, at step 103 of the block diagram in FIG. 1, into the bit-stream representation of the image using an encoding technique which can reduce the total number of bits require to represent the high frequency subband resulting from a hierarchical subband decoder. An example of a preferred encoding technique for encoding the high frequency subbands is described later in this document and hereinafter referred to as "Structured Wavelet Encoded Embedding Tree". or simply "SWEET". Such a preferred arrangement uses non-integer based transforms and to which a quantisation technique may be applied.

Figure 2:
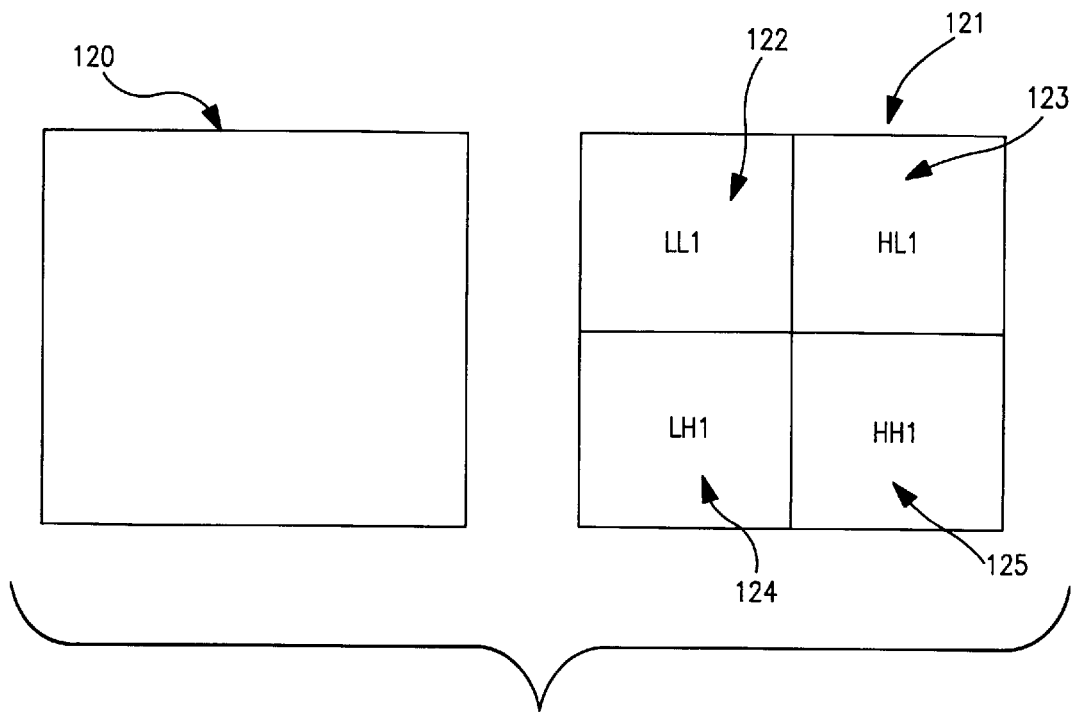
FIG. 2. illustrates an example of single level discrete wavelet transform (DWT) of a digital image.

Referring to FIG. 2, there is shown an example of a discrete wavelet transform 121, for a single level, of a digital image 120. The single level discrete wavelet transform (DWT) analyses an image into a plurality of subbands or sub-images, typically four subbands, namely a Low-Low frequency subband (LL1) 122, a High-Low frequency subband (HL1) 123, a Low-High frequency subband (LH1) 124 and a High-High frequency subband (HH1) 125. The LL1 subband is a lowpass decimated version of the digital image 120 and often referred to as the DC subband for the single level. The numeral associated with a labelling of the subbands indicates a level of decomposition. For example the subband label LL1 represents a Low-Low frequency at a level 1 or single level decomposition. HL4 therefore being a High-Low subband at level 4 of a 4 level subband decomposition (decoding).

Figures 3, 4:
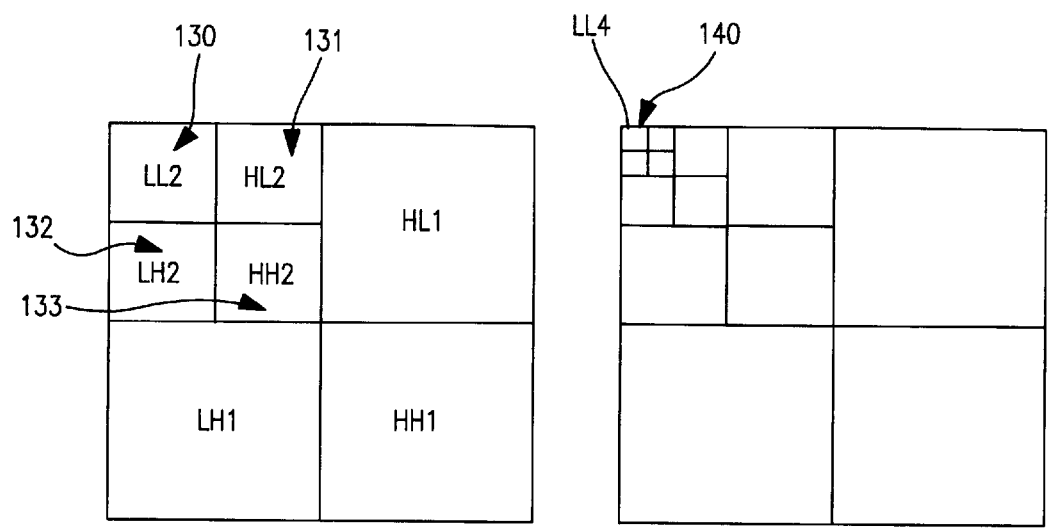
FIG. 3. illustrates a two level DWT of the image of FIG. 2.
FIG. 4. illustrates a four level DWT of the image of FIG. 2.

The LL1 subband 122 of FIG. 2 can be further analysed, using a discrete wavelet transform, into a plurality of subbands resulting in LL2, HL2, LH2 and HH2 subbands, as seen in FIG. 3 identified by reference numerals 130, 131, 132 and 133 respectively, and together with the HL1, LH1 and HH1 subbands form a two-level discrete wavelet transform of the image 120 as illustrated in FIG. 3. Repeating a discrete wavelet transform analysis on LL2 and then on the resulting LL3 subband provides a 4-level DWT of the image 120 as illustrated in FIG. 4. The DWT subband analysis described with reference to FIGS. 2, 3 and 4 is often also known as an octave band filter bank decomposition. A 4-level DWT of the image 120 is decomposed (analysed) into a single DC subband LI4, 140, and a plurality of higher frequency subbands including HL4, LH4, HH4, HL3, LH3, HH3, HL2, LH2, HR2, HL1, LH1 and HH1.

In the preferred embodiment of the present invention the DC subband 140 is incorporated into a bit stream as a raw bitmap image. That is, the DC subband 140 is included into a bit stream in a format which is readily displayable on a display device while the higher frequency subbands are encoded into the bit stream in a compressed format.

Typically, a subband resulting from a discrete wavelet transform comprises a set of coefficients representing the transform coefficient of the subband. Depending upon a set of basis functions associated with a discrete wavelet transform, each application of the discrete wavelet transform to an image or sub-image (subband) provides a resulting set of DC coefficients have a propensity of increasing in value when compared to a corresponding coefficient before the application of the discrete wavelet transform. Typically, the increase in value of the DC coefficients, upon each application of the discrete wavelet transform, is in the order of magnitude of about a factor of 2. This increase in the DC coefficients typically results in an increase of average intensity of the DC sub-image (subband) and therefore, preferably, a quantisation is performed on the DC coefficients. This quantisation nay be performed with each level of transfrom, or alternatively the quantisation step may be applied to the coefficients of the DC subband before incorporating the DC subband 140 into a bit stream as a raw bitmap image.

A variety of quantisation techniques can be applied without departing from the scope and spirit of the present invention. For example, quantising the coefficients of a DC subband can be achieved by bit shifting the binary representations of the coefficients one place to the right (equivalent to dividing by 2) for each level or application of the DWT and truncating any fractional bits. That is for the 4-level subband decomposition of FIG. 4, coefficients of the DC subband are divided by 16 (ie. shifting 4 places to the right of a binary representation of the coefficients) and truncating or ignoring a fractional component of the coefficients. Typically, in an 8-bit representation per coefficient, a coefficient value greater than 255 (decimal) is set to 255 (decimal), and a coefficient value less than zero is set to zero.

Binary representations of the DC subband coefficients are output into a bit stream preferably in scan line order, In the example illustrated by FIG. 4, and assuming an 8-bit/pixel grey scale image of size 512 pixels by 512 pixel, a 4-level DWT results in a DC subband comprising 32×32 coefficients. Hence 32×32 bytes, 8-bits/coefficient, are output as a raw bitmap to the bit stream.

At least one of the subbands, other tan the DC subband, is encoded into the bit stream in a compressed format. The compressed format substantially provides a compressed bitmap image of the higher frequency sub-images (subbands) into the bit steam. Preferably the compression format adopted for the at least one subband, other than the DC subband, substantially utilises the technique of subband or sub-image compression hereinbefore referred to as SWEET, Alternately, the at least one subband can be encoded into the bit stream by other known compression techniques including JPEG standard coding, Huffman coding and Arithmetic coding.

To display a low resolution version of the image (ie. a DC subband or Sub-image) on a display device, a predetermined number of bytes are read directly from the bit stream and displayed on the display device. In the example referred to above, a 32×32 byte raw (grey scale) bitmap image is read directly from the bit stream, with substantially no decoding and preferably the bytes are arranged so a minimal manipulation of the bitmap is required before display of the low resolution version of the image. Often, a small size version (ie. a copy of a digital image dimensionally smaller than the original digital) of a digital image is referred to as a "Thumbnail" size image. For example a 32 pixel by 32 pixel digital image likeness, of a 512 pixel by 512 pixel digital image, is referred to as a thumbnail copy of the 512×512 pixel digital image.

Preferably, to decode a full size image from a bit stream a reverse of the coding process, used to produce the bit stream, is performed. A DC subband is inverse quantised from raw bitmap data incorporated into a bit stream as hereinbefore described. That is for the 4-level subband decomposition example described above, each byte of raw bitmap image data (grey scale) is multiplied by 16 (ie. shifting 4 places to the left each bit of the byte) to produce the coefficients of the DC subband. Non-DC subbands are decoded according to an inverse technique associated with a compression technique used in the encoding of the Non-DC subbands. For example if o at least one of the non-DC subbands is encoded into a bit stream using the SWEET technique, then the at least one non-DC subband is decoded using an associated inverse SWEET technique. A resulting DWT image, or set of subbands, are synthesised using a 4 level inverse DWT to obtain the original digital image, or a good approximation thereof.

Although the foregoing has been described with reference to the example of grey-scale digital images, the preferred embodiment is implemented in relation to colour images. A grey-scale digital image typically comprises pixels of a single colour and each pixel is assigned an 8-bit representation, for the single colour, which provides the pixel with 256 different shades of the single colour (referred to as grey-scales). A digital colour image comprises pixels represented by a plurality of components including Red, Green and Blue (RGB) components or Cyan, Magenta, Yellow (CMY) components or Luminance, Chrominance-Blue and Chrominance-Red (YCbCr) to name a few. The preferred embodiment separately treats each component of a digital colour image as an independent grey-scale image. For instance, a digital colour image represented in RGB format (components) can be treated as three independent grey-scale images corresponding to the red, green and blue components. Conventionally, each pixel component, of a colour image, is represented by an 8-bit representation per component and therefore an image represented by pixels having three components, RGB, are referred to as 24-bit colour images.

Figure 6:
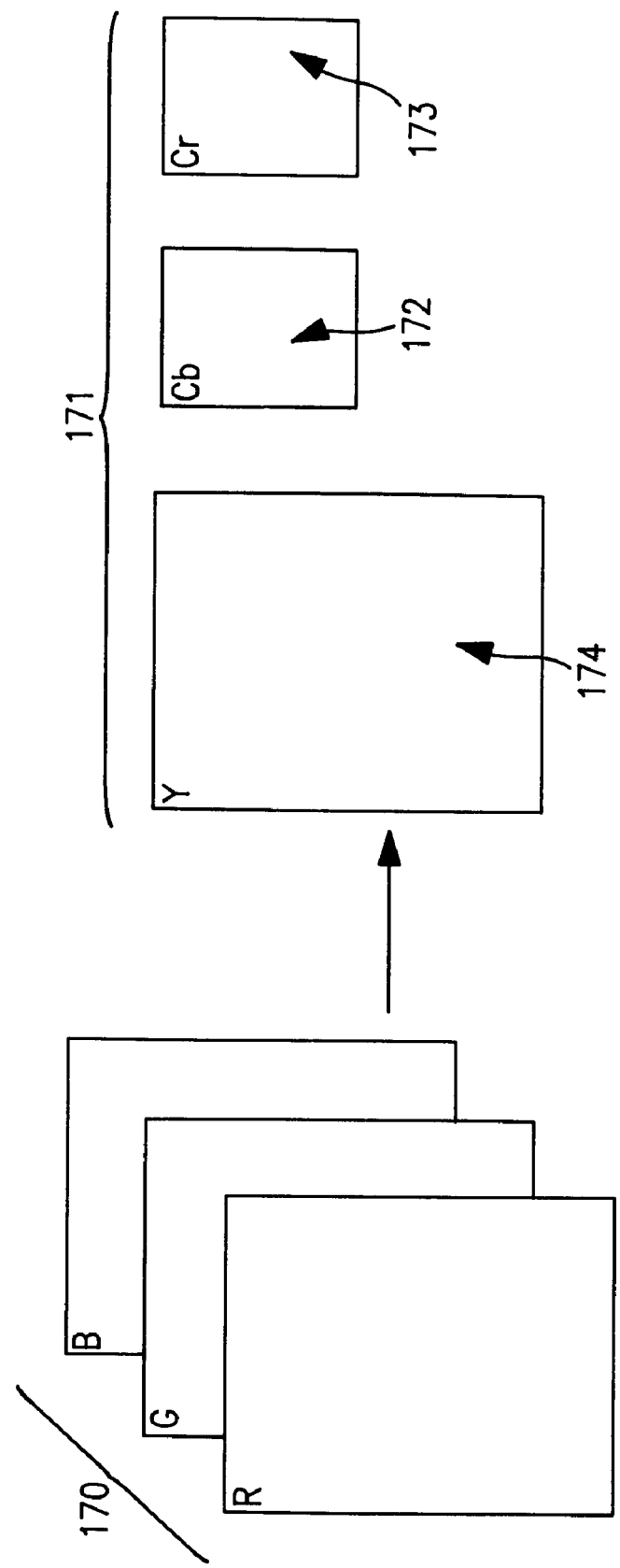
FIG. 6. illustrates a conversion of an RGB image to a YChCr image in accordance with the embodiment of the present invention.

Preferably a digital image represented in Red, Green and Blue (RGB) components 170 is converted to luminance-chrominance format (YCbCr) 171 as schematically illustrated in FIG. 6. The human visual system is typically less sensitive to chrominance than it is to luminance therefore the chrominance components Cb 172 and Cr 173 are commonly sub-sampled providing less information to compress which results in a better compression than having to compress each component without sub-sampling. Sub-sampling of the chrominance data provides "lossy" compression since some information is ignored or discarded by the sub-sampling, however the degradation to the Image is generally not noticeable by the human eye. The luminance component Y 174 and the two chrominance components 172, 173 of the digital image are each discrete wavelet transformed to provide a DC subband for each YCbCr component of the image. The DC subband (sub-image) of each YCbCr component of the image can be converted back to RGB before outputting a raw bitmap of the DC subband in ROB format into a bit stream. This may be performed in concert with the aforementioned quantisation of the DC subband to provide, for example, 8 bits per colour for the DC subband thus enabling the DC subband to be displayed directly on a video display. Non-DC subbands are encoded (compressed) into the bit stream as previously described. The bit stream, representing the compressed image, can then be stored or transmitted as required.

To decode the entire bit stream and obtain substantially a full scale digital image an inverse process is followed The raw bitmap of the DC subband in RGB format is extracted from the bit stream and converted to YCbCr format. The non-DC subbands encoded into the bit stream are decoded (uncompressed) and the result, together with the DC subband in YCbCr format are inverse discrete wavelet transformed a predetermined number of times to provide the desired full scale digital image.

If it is desired to reproduce only the thumbnail image representation, for example to assist in browsing operations in a database of images, the stored bit stream is located in memory and the DC subband extracted. Because the DC subband is in an RGB format, the DC subband may be directly displayed, or displayed using only minimal processing, to reveal the thumbnail.

Although a minor disadvantage in computational performance is incurred by converting an RGB image into a YCbCr image, provided the DC subband is small, the loss in computational performance is not substantial compared with the compression advantage obtained by sub-sampling chrominance components of the YCbCr image.

Preferably, a bit stream comprising a DC-subband, as raw bitmap, and high frequency subbands in a compressed format, further includes header information, usually at the beginning of the bit stream, which provides information about the raw bitmap. For example, the header may include the length in bytes of a raw bitmap, a location pointer to a position within a bit stream for locating where in the bit stream the raw bitmap is positioned, if the raw bitmap does not substantially follow the header information or if the raw bitmap is located in different positions in a plurality of images.

Embodiments of the invention can preferably be practised using a conventional general-purpose computer system 150, such as that shown in FIG. 5, wherein the process described with reference to FIG. 1 to FIG. 4 is implemented as software executed on the computer, system 150. The software may be derived from a computer readable medium such as a disk, tape, or a computer network such as the Internet. The computer system 150 comprises a computer module 151, input devices including a keyboard 152 and a mouse 153, and a display device 154.

The computer module 151 includes at least one processor unit 155, a memory unit 156 which typically include random access memory (RAM) and read only memory (ROM), interface devices including a video interface 157, and an input/output interface, 158 typically connected to the keyboard 152 and the mouse 153. A storage device 159 is provided and can include one or more of the following devices: a floppy disk, a hard disk drive, a CD-ROM drive or similar a non-volatile storage device known to those skilled in the art. The components 155 to 159 of the computer module 151, typically communicate via an interconnected bus 160 and in a manner which results in a conventional mode of operation of the computer system 150 known to those in the relevant art. Examples of computers on which the embodiments can be practised include IBM-PC/ATs and compatibles, Sun Sparcstations or alike computer systems.

In a preferred implementation, the computer module 151 may be supplemented by an image processor device 161 also connected to the bus 160 and configured to perform in hardware special processing functions that would otherwise be performed more slowly in software. For example, the conversion from RGB to YCbCr although simple and not burdening upon computational resources may, in some embodiments, be preferred or required to be perform more quickley in hardware, for example to ensure a real-time processing capability. The transform and compression operations may also be performed in hardware by the image processor.

SWEET—A Method For Digital Image Compression

This disclosure relates to a method and apparatus for representing digital image data, and in particular to a method and apparatus for encoding and decoding transform coefficients obtained from digital image data.

A number of transform-based image coding techniques are known which involve linear transforming a source image to decorrelate data and then encoding the transform coefficients Such conventional techniques include the JPEG standard image compression method, which employs an 8×8 block discrete cosine transform (DCT). JPEG encoding involves transforming blocks of a source image using the DCT, quantising the resultant transform coefficients where most of the compression is effected taking advantage of visual perception, and lossless encoding the quantised coefficients in a predefined zig-zag sequence from lowest frequency coefficients to highest frequency coefficients.

There is also known a compression technique termed the embedded zerotree wavelet (EZW) method. EZW involves applying a discrete wavelet transform to a source image to decompose the image into a number of high frequency subbands and a lowest frequency subband, normally at a number of different resolution levels or scales. Zero tree encoding is then applied to the subbands dependent upon predictions of the self-similarity of coefficients across scales. The zero-tree-encoded coefficients are then lossless encoded using arithmetic coding.

However, both techniques utilise complex methods for encoding position information and employ lossless encoding. Thus, the foregoing methods have a number of disadvantages including lack of flexibility and complexity in the coding technique.

In essence, the SWEET process of the present disclosure provides a method of representing a digital image to provide a coded representation, the method comprising the steps of:

transforming the digital image to derive a plurality of coefficients, each coefficient represented by a predefined bit sequence, selecting a portion of the plurality of coefficients as a region; and (a) scanning the significance of each bitplane of the selected region from a most significant bitplane towards a least significant bitplane and providing a first token in the coded representation for each insignificant bitplane until a significant bitplane is determined, wherein a second token is provided in the coded representation for the significant bitplane;

(b) partitioning the selected region into two or more subregions having a predetermined form, and setting each of the subregions as the selected region; and (c) repeating steps (a) and (b) commencing from the significant bitplane until the selected region has a predetermined size, wherein the coefficients of the selected region are coded and provided in the coded representation.

Preferably, the linear transforming step comprises applying a discrete wavelet transform to the digital image, and the selected portion of the coefficients initially comprises the entire plurality of coefficients, or a subband of the coefficients.

Preferably, the first and second tokens comprise bit values of 0 and 1, respectively.

Preferably, the subregions are equally sized, and optionally are square.

Preferably, the predetermined size of the subregion is a 1×1 coefficient. Still further, the 1×1 coefficient is encoded by outputting bits of the corresponding bit sequence beginning with the respective significant bitplane. Preferably, only bits of the corresponding bit sequence above a predetermined minimum bit level are output in the coded representation.

Preferably, in step (c), steps (a) and (b) are repeated otherwise until each bitplane of the selected region has been scanned. Each bitplane of the selected region above a minimum bit level is scanned.

SWEET also provides a method of encoding a digital image, the method comprising the steps of:

decomposing the image using a discrete wavelet transform to provide a number of subbands;

for each subband, selecting the subband as an initial region and performing the following sub-steps:

(a) checking if a current bit level of the selected region is significant;

(b) if the current bit level is significant, outputting a first token in a coded representation and partitioning the selected region into a number of equally sized sub-regions, wherein each sub-region is processed as the selected region in turn;

(c) if the current bit level is insignificant, outputting a second token in the coded representation and selecting the next lower bit level of the selected region as the current bit level;

(d) repeating steps (a) to (c) until the current bit level is less than a specified minimum bit level, or the selected region has a predetermined size and coefficients of the selected region are coded in the coded representation Preferably, the coefficients of the selected region are coded by representing each coefficient by the bits between the corresponding current bit level and the minimum bit level.

SWEET also provides a method of encoding a digital image, the method comprising the steps of:

a) dividing the digital image into a plurality of blocks;

b) applying a subband transform to each of the blocks to provide a plurality of AC subband regions, at one or more resolutions, and a PC subband region for each block;

c) selection the DC subband region as a selected region and performing the following sub-steps;

ca) checking if a current bitplane of the selected region is significant;

cb) if the current bitplane is significant, outputting a first token in a coded representation and partition the selected region into a number of subregions, wherein each sub-region is processed as the selected region in turn;

cc) if the current bitplane is insignificant, outputting a second token in the coded representation and selecting the next lower bitplane of the selected region as the current bitplane;

cd) repeating substeps ca) to cc) until the current bitplane is less than a specified minimum bitplane, or the selected region has a predetermined size and coefficients of the selected region are coded in the coded representation;

d) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;

e) setting one or more AC subband regions, of a current resolution level, as a selected region and performing the sub-steps ca) to cd);

f) repeating step e) until substantially all AC subbands of the current resolution level have been encoded; and g) repeating steps d) to f) until all AC subbands of each block have been encoded.

Other aspects of SWEET include a method for decoding the coded representation of a digital image, an apparatus for representing a digital image to provide the coded representation, an apparatus for decoding the coded representation of a digital image, a computer software system for representing a digital image to provide the coded representation, and a computer software system for decoding the coded representation, in which the coded representation is produced in accordance with the first or second aspect of tho invention.

Figure 7:
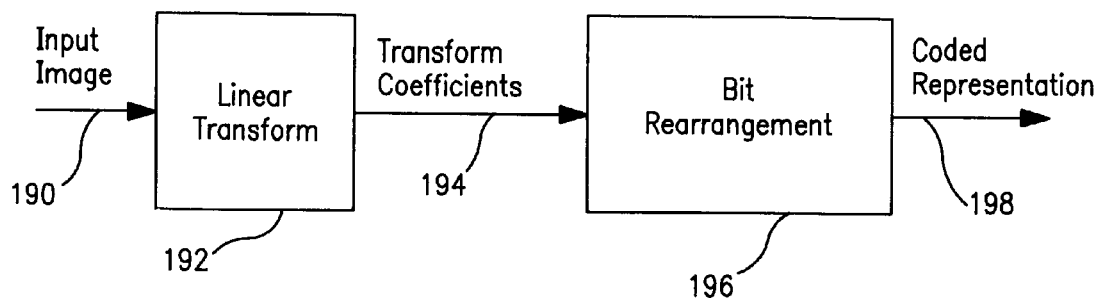
FIG. 7 is a high-level block diagram illustrating the image representation technique according to the embodiments of SWEET.

A high-level block diagram is illustrated in FIG. 7 to provide an overview of the embodiments of the SWEET methods. An input image 190 is provided to the transform block 192, which is preferably a linear transform, to produce corresponding transform coefficients 194. A discrete wavelet transform (DWT) is preferably employed.

The two-dimensional DWT of an image is a transform that represents the image using a low frequency approximation to the image and three high frequency detail components. Conventionally, these components are termed subbands. Each of the four sub-images formed by the DWT is one quarter of the so of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once an then applying the DWT to the low subband resulting from the transformation. Thus, this results in 9 detailed subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced without departing from the scope of the invention. For example, a discrete cosine transform (ICT) can be practiced. The transform coefficients 194, or more specifically the bit sequences representing their values, are then coded by the bit rearrangement block 196 in an efficient fashion to provide the coded representation 199.

The decoding process is simply the reverse of this encoding process. The encoded coefficients are decoded into the transform coefficients. The (transform domain) image is then inverse transformed to form the original image, or some approximation thereof.

Figure 5:
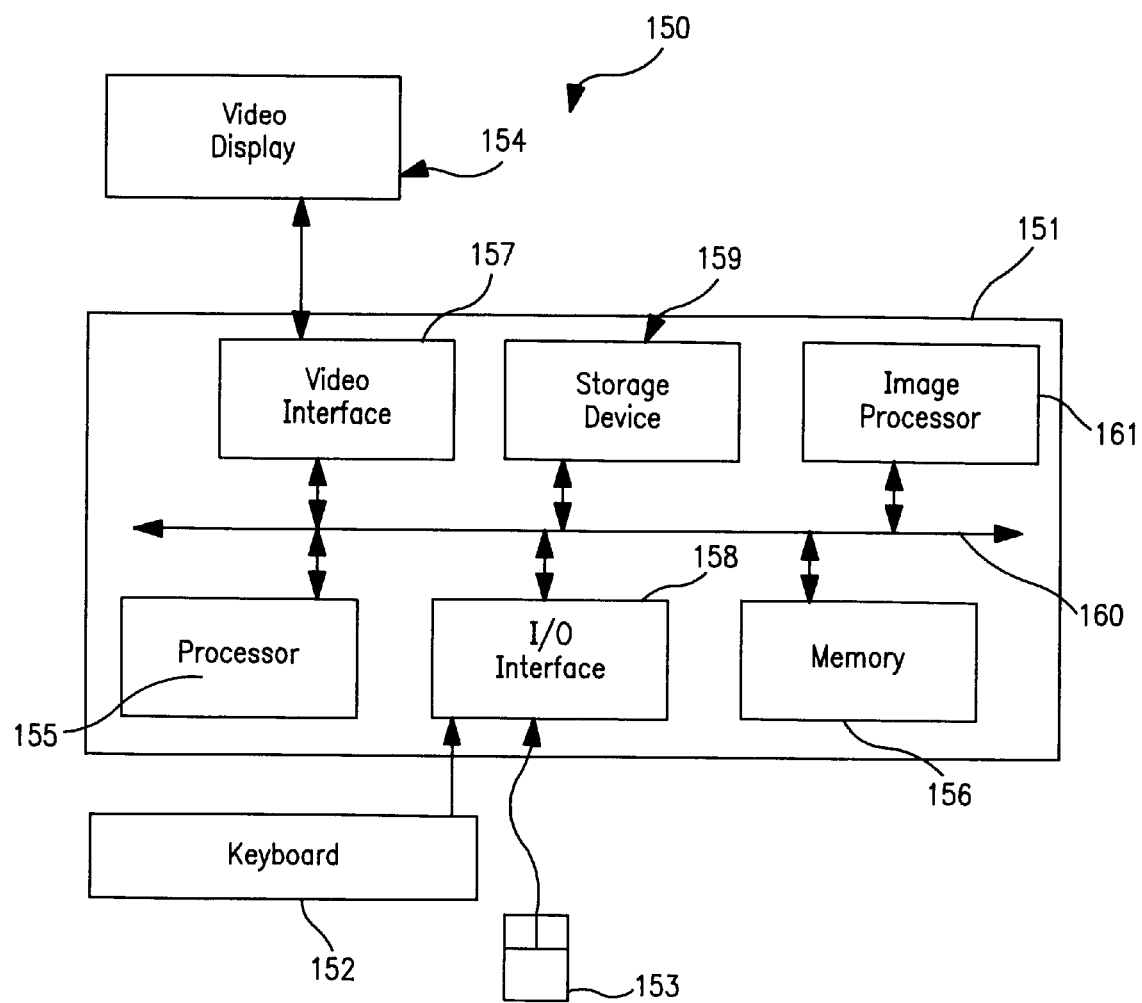
FIG. 5, is an example schematic block diagram of a conventional apparatus (computer) for practising the embodiment of the present invention.

SWEET is preferably be practiced using a conventional general-purpose computer system, such as the computer system 150 shown in FIG. 5, wherein the processes of FIGS. 9 to 12 or FIGS. 14 to 17 are implemented as software executing on the computer system 150. In particular, the steps of the coding and/or decoding methods are effected by instructions in the software that are carried out by the computer system 150.

Before proceeding with a further description of the SWEET implementation, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 00001001. In this number, bit 3 is equal to 1, while bits 2, 1, and 0 are equal to 0, 0, and 1. respectively. A transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this de dimensional space which passes rough each bit sequence at the same bit number is called a bitplane.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The embodiment of the invention provides a method and apparatus for representing (or coding) these leading zeros, for blocks of coefficients, in an efficient manner. The remaining bits and sign of the number are is encoded directly without modification.

To simplify the description and not to obscure unnecessarily the invention, the transform coefficients are assumed hereinafter to be represented in an unsigned binary integer form, with a single sign bit. That is, the decimal numbers −9 and 9 are represented with tie same bit sequence, namely 1001. with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary for this embodiment of the invention. Further, for the purpose of compression, any information contained in fractional bits is normally ignored.

A region consists of a set of contiguous image coefficients. The term coefficient is used hereinafter interchangeably with pixel, however, as will be well understood by a person skilled in the art, the former is typically used to refer to pixels in a transform domain (eg. a DWT domain).

Encoding Process of SWEET

Figure 9:
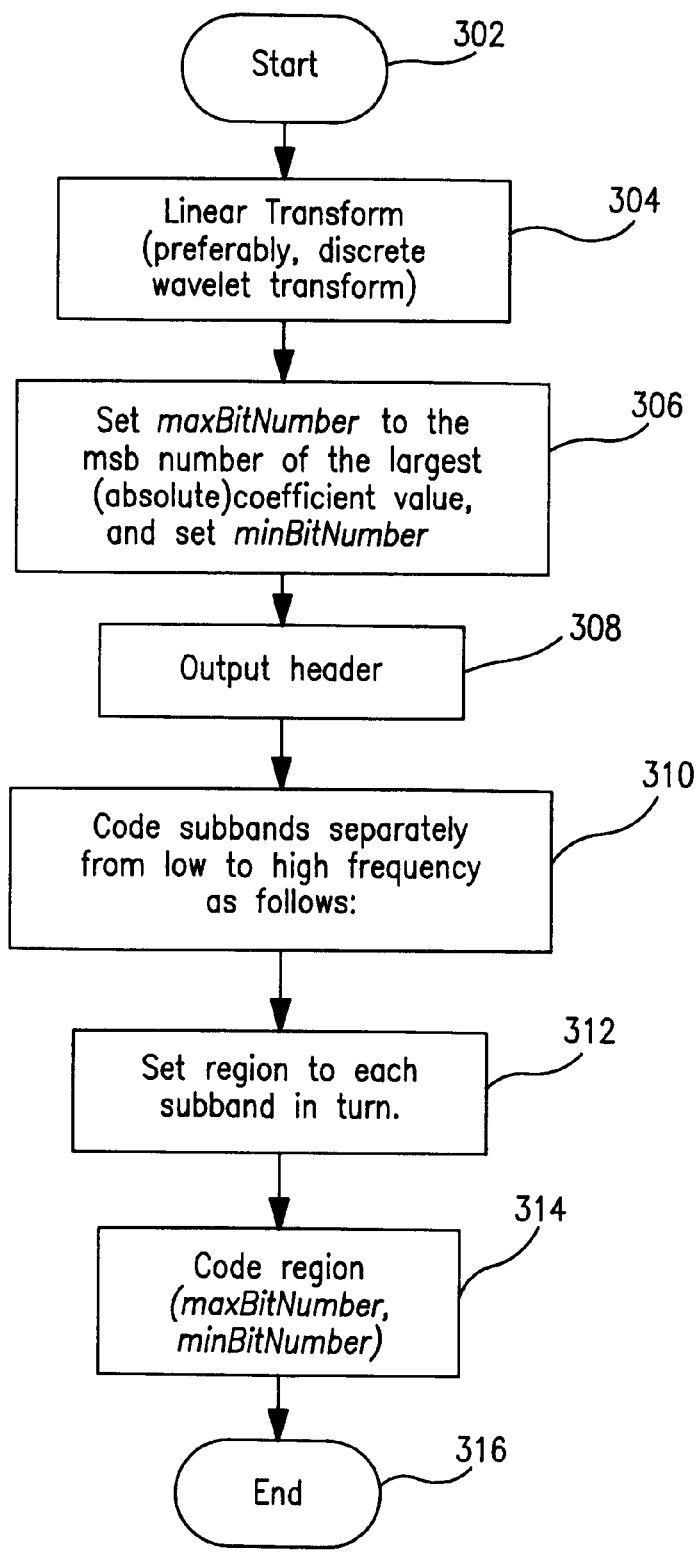
FIG. 9 is a flow diagram illustrating the method of representing, or encoding, an image according to the preferred embodiment of SWEET.

FIG. 9 is a flow diagram illustrating the image encoding method according to the preferred embodiment. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients consisting of the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308 which provides an output header in the coded representation of the input image. Thus, in a practical implementation, header information is output as part of the coded representation. For example, the is output header of the embodiment of the invention may contain information about the source image, including the image height and width, the number of levels of at DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBitNumber as parameters. This provides a hierarchal code, since lower resolution versions of the image are coded into the bit stream before higher resolutions. Processing terminates in step 316.

Figure 10:
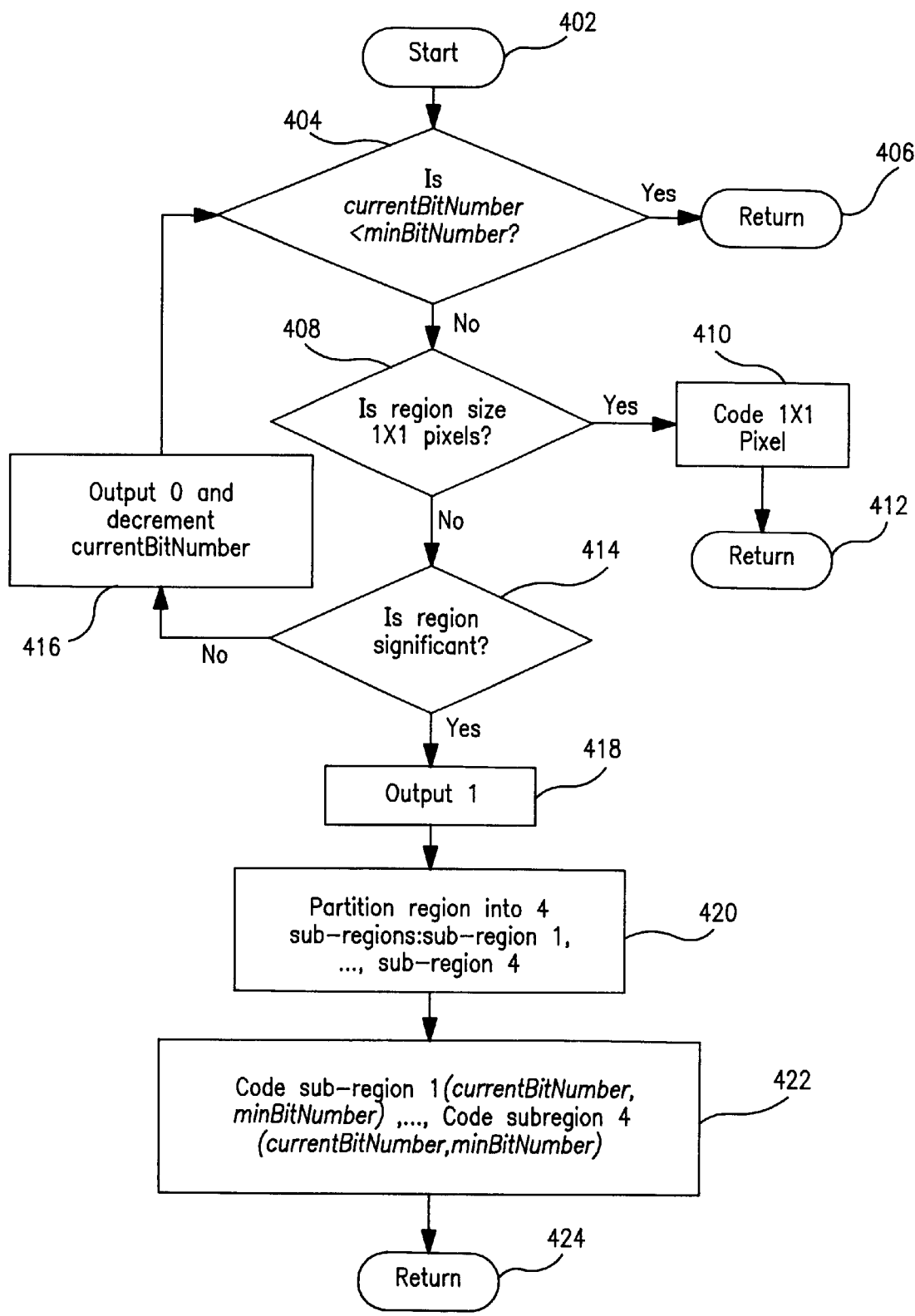
FIG. 10 is a detailed flow diagram illustrating He step of coding a region in FIG. 9.

FIG. 10 is a detailed flow diagram of the procedure "Code region(currentBitNumber, minBitNumber)" called in step 314 of FIG. 9 for coding each region, where maxBitNumber is provided as the currentBitNumber. In step 402, processing commences. The inputs to the region coding process of FIG. 10 include the currentBitNumber and minBitNumber parameters. Preferably, the method is implemented as a recursive technique where the process is able to call itself with a selected region or sub-region. However, the process may implemented in a non-recursive manner without departing from the scope and spirit of the invention.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision lock 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remain bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}| < 2^n, \forall\ i, j \in R,$$ (Equation 1)

where R denotes the region, and $c_{ij}$ denotes coefficient (i,j) in this region.

If decision block 414 returns false (no), processing continues at step 416. In step 416, a value of a (or first token) is output in the coded representation steam, and The currentBitNumber parameter is decremented by 1. That is, the next, lower bitplane of the region is selected for processing. Processing then continues at decision block 404, where the region is again processed with the parameters currentBitNumber-1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably. 4) of subregions using a specified partitioning algorithm. The partitioning algorithm used is known to the decoder.

Figure 8:
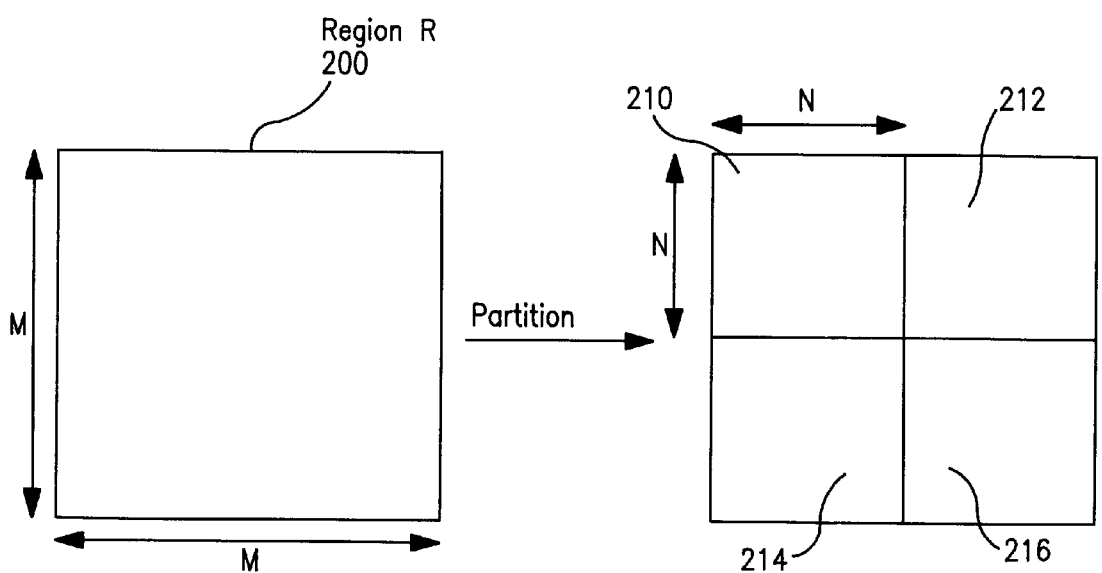
FIG. 8 is a diagram illustrating partitioning according to a preferred embodiment of SWEET.

In this embodiment of the invention, square regions are used. A region is partitioned preferably into 4 equal-sized (square) subregions. As shown in FIG. 8, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2. and encode these partitions separately. In any case, his initialisation has minimal effect on the overall results its if done in an intelligent fashion. In an alternate embodiment, a different partition may be used that is suitable for a block-based coder.

In step 422, each subregion is then coded with the same currentBitNumber and minBitNumber parameters. This is preferably done by means of a recursive call to the procedure "Code region (currentBitNumber. minBitNumber)" of FIG. 10. This coding of subregions may be implemented in parallel or sequentially. In the latter case, the processing may commence from a low frequency subband to higher frequency subbands in turn.

In the coded representation, a transform coefficient is coded by simply output the pixel bits from the currentBitNumber to the minBitNumber. Preferably, a convention is followed whereby the sign is output only if some of the coefficient bits were non-zero. For example, if currentBitNumber 3. minBitNumber=1, then –9 (00001001) is coded as "1 0 0" followed by a sign bit "1".

DeCoding Process of Preferred Embodiments

Figure 11:
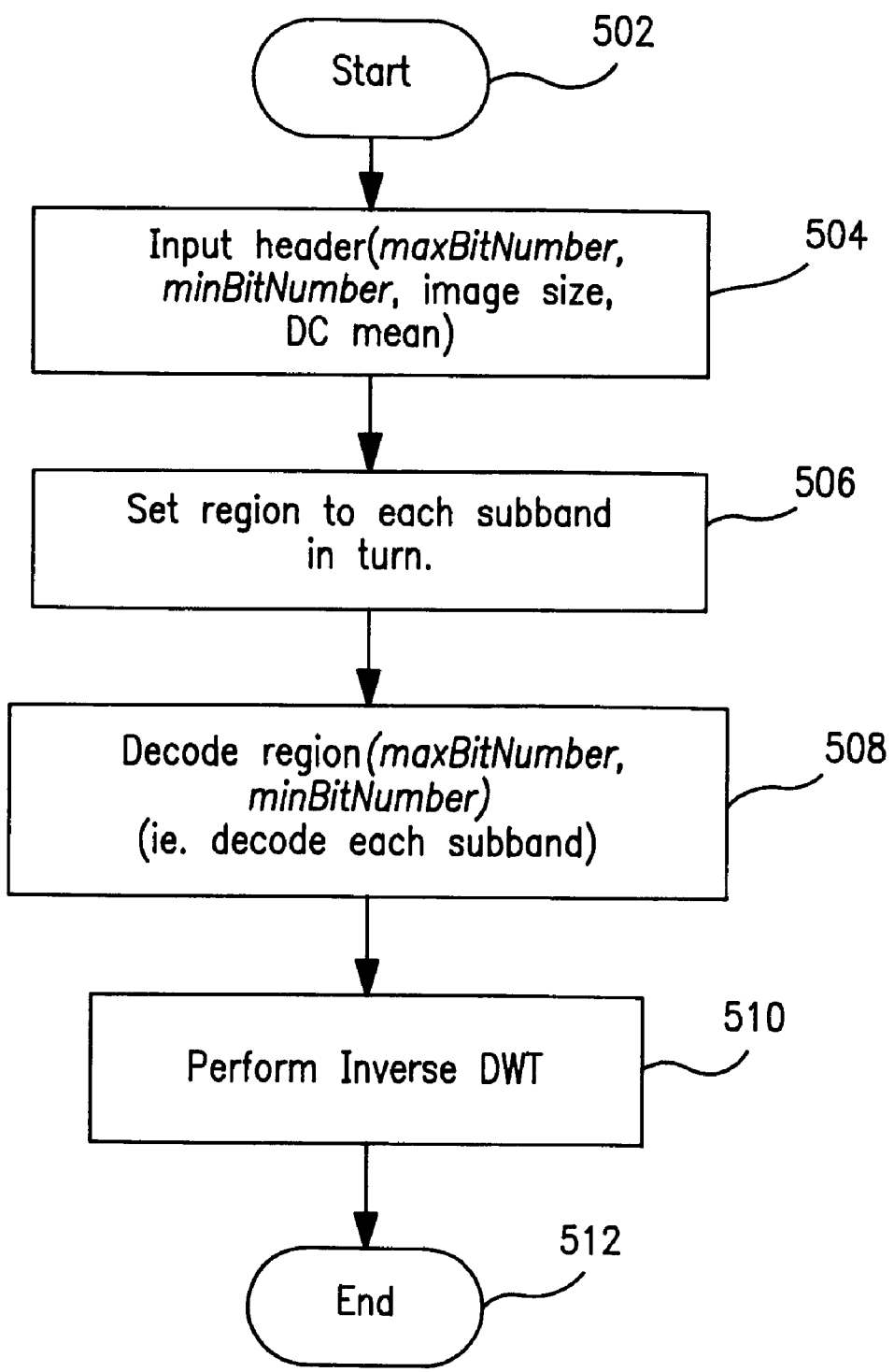
FIG. 11 is a flow diagram illustrating the method of decoding a coded representation of an image produced in accordance with the method of FIG. 9.

FIG. 11 is a flow diagram illustrating a method of decoding the coded representation of an image obtained using the process of FIGS. 9 and 10. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters, In step 510, the inverse DWT is applied to the decoded selected region. Processing terminates in step 512.

Figure 12:
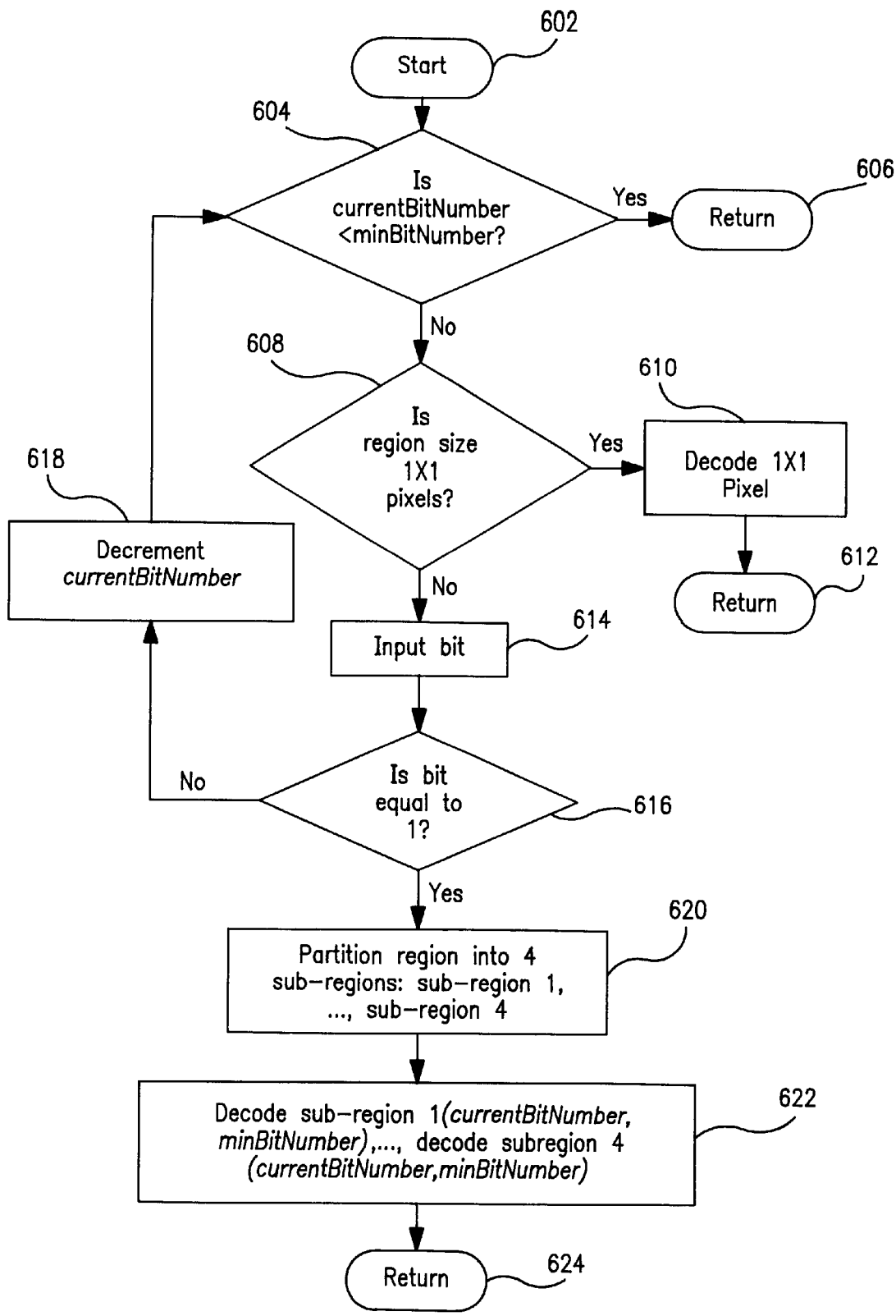
FIG. 12 is a detailed flow diagram illustrating tie step of decoding a region in FIG. 11.

FIG. 12 is a detailed flow diagram of step 508 of FIG. 11 for decoding each region using procedure call "Decode region (currentBitNumber, minBitNumber)", where maxBitNumber is provided as the currentBitNumber. In step 602, processing commences. The inputs to the region decoding process of FIG. 12 are the currentBitNumber and minBitNumber parameters. Again, the method is preferably implemented as a recursive technique. However, the process may be implemented in a non-recursive manner without departing from the scope and spirit of the invention.

In decision block 604, a check is made to determine if the currentBitNumber is less than the minBitNumber. If decision block 604 returns true (yes), processing continues at step 606, where processing returns to the calling procedure. Otherwise, it decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the subregions is decoded using the currentBitNumber and minBitNumber. In the preferred embodiment, this is carried out by means of a recursive call to the process illustrated in FIG. 12. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

Two-Dimensional Example

The method effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient in certain situations, namely for coding discrete wavelet transform image coefficients, which typically exhibit a large dynamic range. A few coefficients typically have very large values, while most have very small values.

Figures 13A, 13B, 13C, 13D:
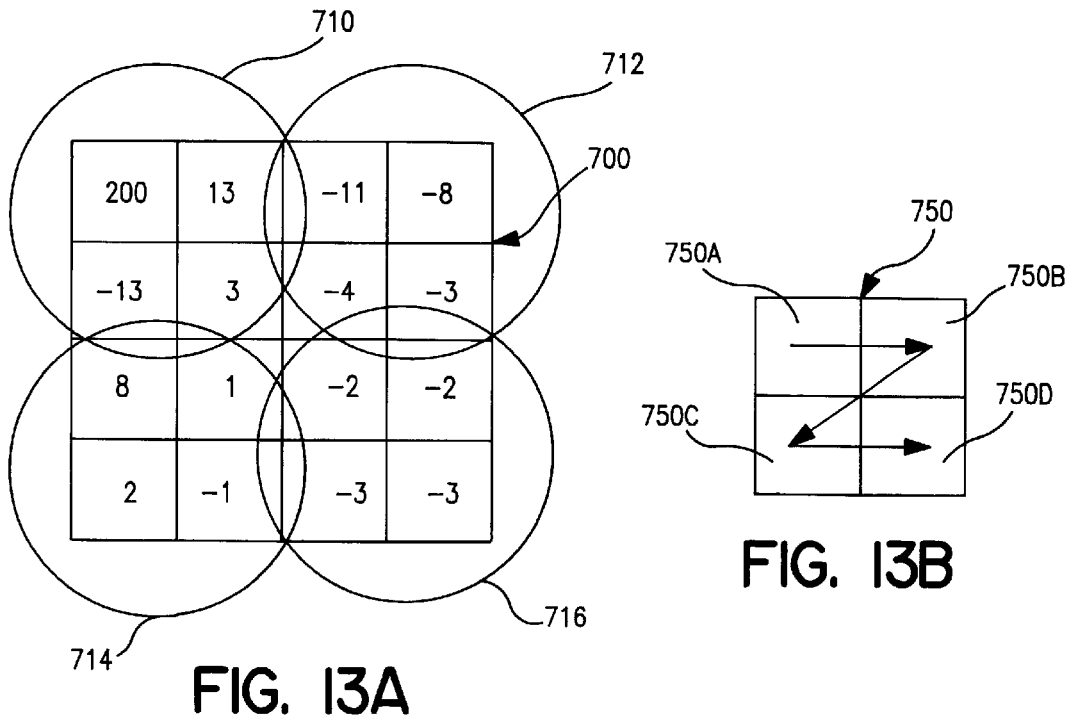
FIGS. 13A to 13D are diagrams illustrating the processing of a two-dimensional, eight-efficient region In accordance with the encoding and decoding method of FIGS. 9 to 12.

An example of encoding a two-dimensional region comprising 4×4 coefficients is described with reference to FIGS. 13A to 13D. The processing of the 4×4 region 700 of FIG. 13A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}$$

The minBitNumber is set to 3, for illustrative purposes. A header is preferably output in the coded representation containing the maxBitNumber and minBitNumber. The process of coding the region 700 then follows.

At currentBitNumber=7. a one (1) is output since the region 700 is significant with respect to bit number 7 (see decision block 404, 408, and 414 and step 418 of FIG. 10). The region 700 is then partitioned into four sub-regions (see step 420 of FIG. 10): the top left region 710, the top right region 712, the bottom left region 714 and the bottom right region 716 of FIG. 13A. Each of the subregions consist of 2×2 coefficients.

The sub-regions 710, 712, 714 and 716 of FIG. 13A are in turn coded in the predefined processing sequence shown of FIG. 13B, where a region 750 consists of four subregions 750A to 750D. The three arrows illustrated in the diagram indicate the order or sequence of processing, that is, top left subregion 750A, top right sub-region 750B, bottom left sub-region 750C and bottom right sub-region 750D, respectively.

The subregion 710 of FIG. 13A is coded first (see step 422 of FIG. 10). For the currentBitNumber equal to 7, a one (1) is output in the coded representation. The sub-region 710 is then partitioned into four 1×1 pixels having decimal values 200, 13, –13 and 3. Each of these coefficients is coded by outputting the bits of each coefficient from the currentBitNumber=7 to the minBitNumber=3 (see decision block 408 and step 410 of FIG. 10). A sign bit is then output if required. Thus, the decimal value is 200 is coded as 11001 followed by the sign bit 0. The coefficient value 13 is coded as 00001 with a sign bit 0. The coefficient value 13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$\underset{200}{11\underline{1}001} \quad \overset{sign\ bit}{\underline{0}} \quad \underset{13}{00001}\underset{-13}{000001}\underset{3}{100000}.$$

The header information is not shown in the foregoing expression.

The top right sub-region 712 is then coded (per FIG. 13B). A zero (0) is output for each of currentBitNumber equal to 7, 6, 5, and 4, since the region 712 is insignificant with respect to these hit numbers. A one (1) is output at currentBitNumber 3, since this bitplane is significant with respect to bit number 3. The sub-region 712 is partitioned into the four 1×1 pixels having values –11, –8, –4 and –3. These decimal values are coded as bit value 1 with sign bit 1I bit value 1 with sign bit 1 and bit values 0 and 0 without sign bits, respectively. Thus, at this stage, the coded representation is as follows:

$$1111001000001000001100000000001\ \underset{-11}{\underline{11}}\ \underset{-8}{\underline{11}}\ \underset{-4}{0}\ \underset{-3}{0}$$

The bottom left sub-region 714 is then encoded. A zero (0) is output for each of currentBitNumber equal to 7, 6, 5, and 4, since the region 714 is insignificant with respect to these bit numbers, A one (1) is output at currentBitNumber equal to 3, since this bitplane is significant with respect to bit number 3. The sub-region 714 is then partitioned into four 1×1 pixels having values 8, 1, 2 and –1. These are coded respectively as binary value 1 with sign bit 0, and binary values 0,0 and 0 without sign bits.

Finally, the bottom right sub-region 716 having values –2, –2, –3, and –3 is coded. A zero (0) is output for each of currentBitNumber=7, 6, 5, 4 and 3 since the subregion 716 is insignificant with respect to these bit numbers. No sign bits arc output. Thus, the coded representation is as follows;

11110010000010000011000000000011111000000110000000000

The decoder simply mimics the encoding process to reconstruct the region from the coded representation as depicted in FIG. 13C.

The decoding process can be made "smarter" in a number of ways. One such a "smarter" way is depicted in FIG. 13D, In this case, the magnitude of the non-zero coefficients is each increased by half of 2 to the power of minBitNumber. This is depicted in FIG. 13D. In this manner, the "smart" decoding processing generally reduces the mean square error between the decoded and the original coefficients. Still further, the encoder can alternatively perform this (Type of) operation, thereby leaving the decoder to use the simplest depicted in FIG. 13C.

Encoding Process of Alternate SWEET

A coding process according to an alternate SWEET method is hereinafter described with reference to FIGS. 14 to 17. The processes illustrated in the flow diagrams of FIGS. 14 to 17 may be implemented using software executing on a general-purpose computer 150 corresponding to that described above.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined sew of coefficients from he frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localised and therefore are generally efficient when implemented using computer systems.

Figure 14:
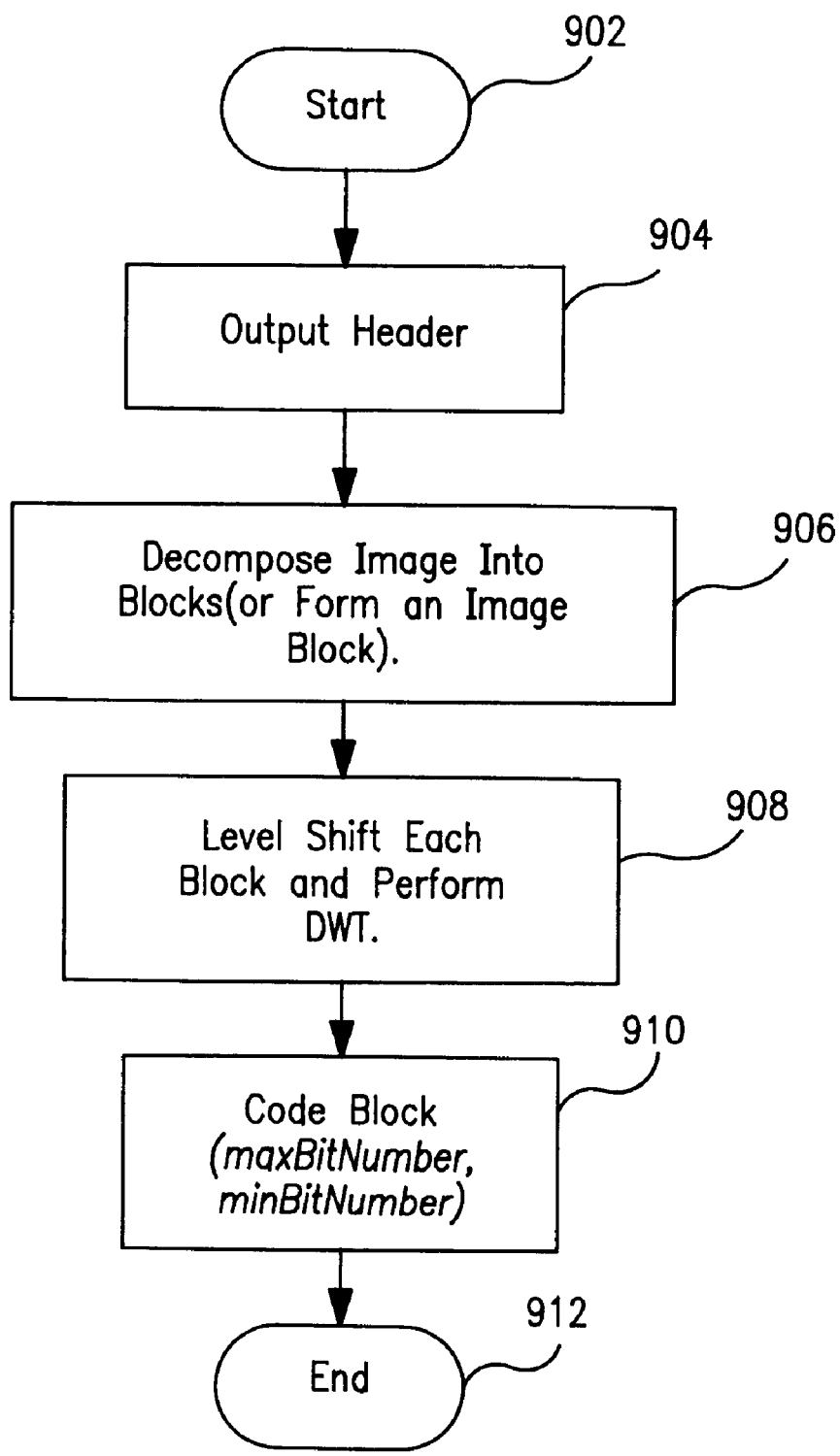
FIGS. 14 to 17 are flow diagrams illustrating the method representing, or encoding, an image according to an alternate embodiment of SWEET.

FIG. 14 is a flow diagram illustrate the block-based encoding process according to the alternate embodiment of the invention. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+17 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit ROB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 15:
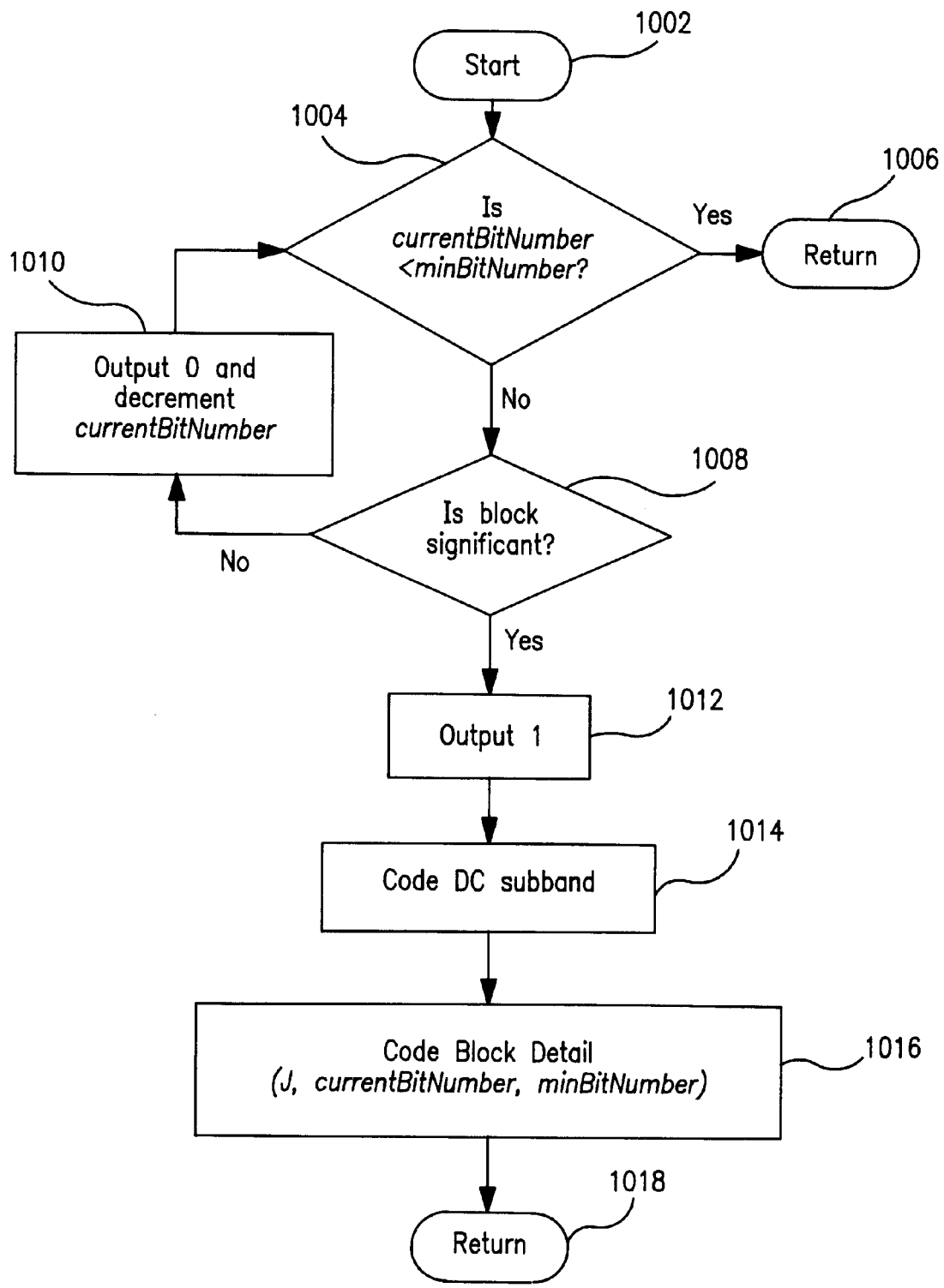

Step 910 for coding a block is illustrated in detail in the flow diagram of FIG. 15. Inputs to the block coding process of FIG. 15 include the currentBitNumber and the minBitNumber parameters. With reference to step 910 of FIG. 14, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1009 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

Figure 17:
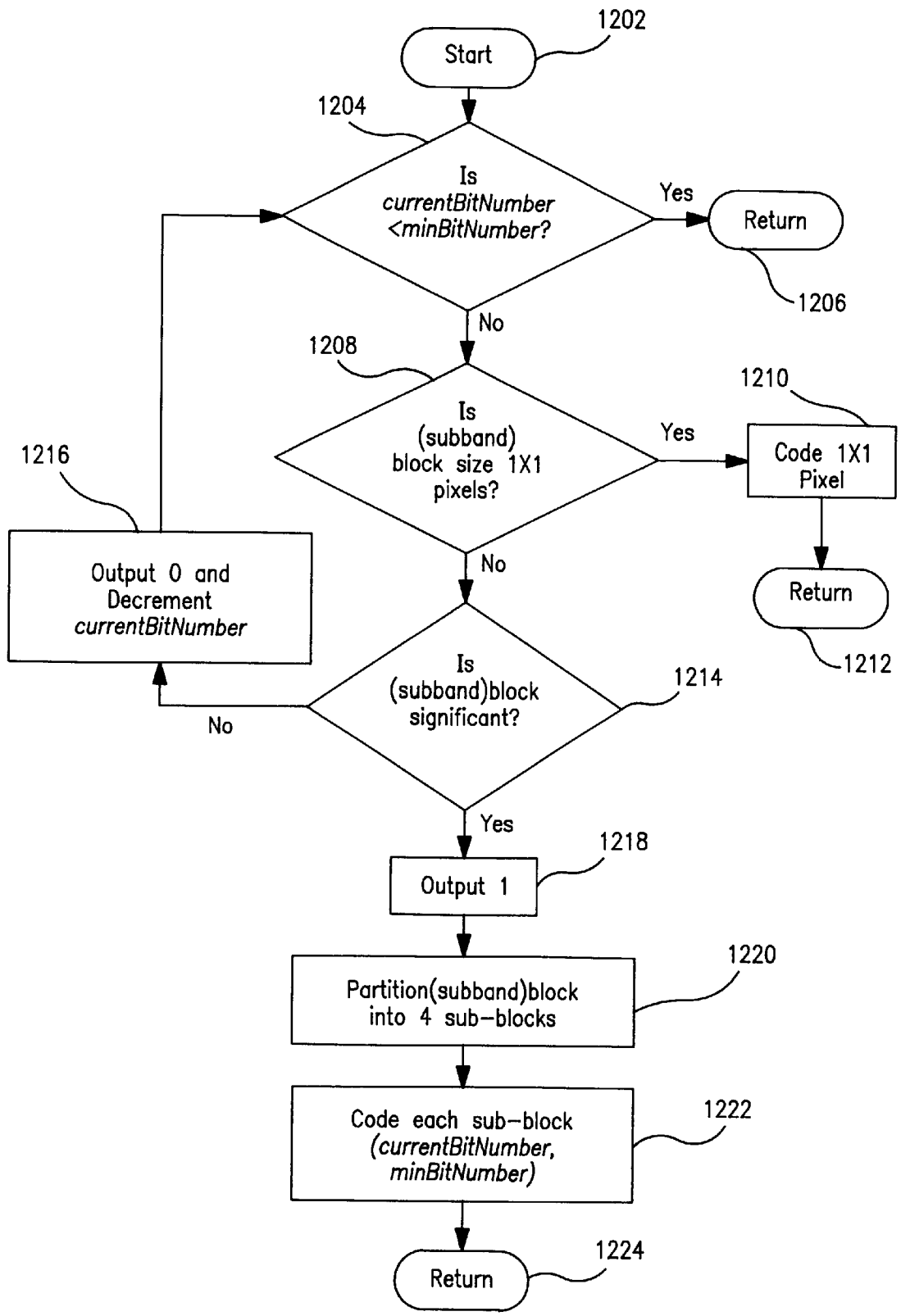

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling, procedure. Thus, given that the block is significant, steps 1012, 1014 and 1016 are carried out to use the (generalised) quadtree segmentation to find all coefficients with an MSB number greater than the minBitNumber. If the block is significant, it is partitioned into two "sub-blocks", the DC subband coefficients and the block consisting of the remaining coefficients, referred to as the "block detail" for level J since it represents the high frequency information about the block of level J at all lower levels Step 1014 of FIG. 15 for coding the DC subband is illustrated in detail by the flow diagram of FIG. 17. That is, FIG. 17 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 rent false (no). processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 17. In step 1224, execution returns the calling procedure.

Thus, in the process of FIG. 17, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 16:
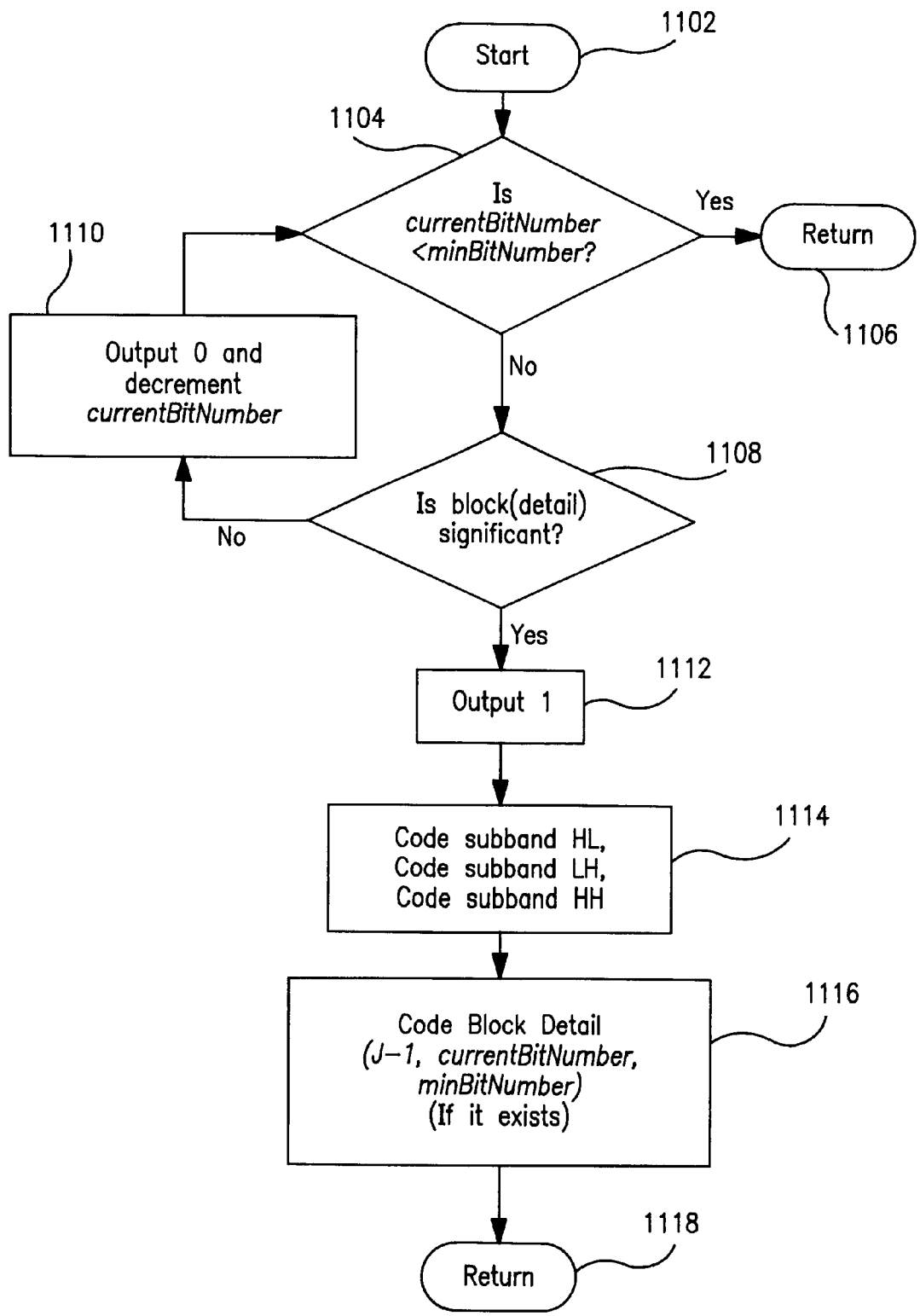

Step 1016 of FIG. 15 for coding block detail is illustrated by the flow diagram of FIG. 16. In step 1102, processing commences, In decision block 1104, a check is made to determine if the currentBitNumber is less than the minBit-Number. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

Is In step 1112, a one (1) is output in the coded representation to indicate that the block (detail) is significant. In step 1114, each of the high-low (HL), low-high (LH), and high-high (HR) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J-1, currentBitNumber and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and Fe block detail for level J-1 (if J-1 is greater than 0). This partitioning approach is motivated by the so called 1/f type spectral models.

The decoding process for the alternate SWEET method can be implemented by mimicking the coding process described with reference to FIGS. 14 to 17.

SWEET therefore provides methods and apparatuses for representing digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the embodiments provide methods and apparatuses for representing (or coding) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the embodiment include the depth first nature of the coding. Further, in the case of coding subbands, the advantageous aspects of the invention include hierarchical coding of each subband separately.

The foregoing describes only a number of embodiments of the present invention, however, modifications and/or changes can be made thereto by a person skilled in the art without departing from the scope of the invention.

We claim:

1. A method of compressing a color digital image, the method comprising the steps of:

decomposing each color component of the digital image into a DC subband and a plurality of higher frequency subbands, using a non-integer based discrete wavelet transform;

encoding into a bit stream the DC subband for each color as a substantially uncompressed raw bitmap image, wherein coefficients of the DC subband are contiguously ordered in the bit stream; and encoding into the bit stream the plurality of high frequency subbands as a compressed bitmap image.

2. A method according to claim 1, wherein said transform is a non-integer based discrete wavelet transform and the coefficients of said DC subband are quantised at one of each level of transform, or on completion of a final level of transform.

3. A method according to claim 1, wherein said encoding of the high frequency subbands substantially utilizes one of at least arithmetic coding and baseline JPEG coding.

4. A method according to claim 1, wherein said uncompressed image includes a grey scale raw bitmap image format.

5. A method according to claim 1, wherein said uncompressed image corresponds to an RGB color format.

6. A method according to claim 1, wherein said color digital image uses a Red, Green, Blue (RGB) raw bitmap image format.

7. A method according to claim 1, wherein said color digital image uses a Cyan, Magenta, Yellow (CMY) raw bitmap image format.

8. A method according to claim 1, wherein said encoding of the higher frequency subbands comprises the steps of:

deriving a plurality of coefficients from said decomposing of said digital image, each said coefficient represented by a predefined bit sequence;

selecting a portion of said plurality of coefficients as a region;

(a) scanning the significance of each biplane of said selected region from a most significant bitplane towards a least significant bitplane and providing a first token in said coded representation for each insignificant bitplane until a significant bitplane is determined, wherein a second token is provided in said coded representation for said significant biplane;

(b) partitioning said selected region into two or more subregions having a predetermined form, and setting each of said subregions as said selected region;

(c) repeating steps (a) and (b) commencing from said significant bitplane until said selected region has a predetermined size, wherein said coefficients of said selected region are coded and provided in said coded representation.

9. The method according to claim 8, wherein said decomposing step comprises applying a discrete wavelet transform to said digital image.

10. The method according to claim 9, wherein in said portion comprises a subband of said plurality of coefficients.

11. The method according to claim 8, wherein said region comprises said entire plurality of coefficients.

12. The method according to claim 8, wherein said first and second tokens comprise bit values of 0 and 1, respectively.

13. The method according to claim 8, wherein said subregions are equally sized.

14. The method according to claim 13, wherein said subregions are square.

15. The method according to claim 8, wherein said predetermined size of said subregion is a 1×1 coefficient.

16. The method according to claim 15, wherein said 1×1 coefficient is encoded by outputting bits of said corresponding bit sequence beginning with the respective significant bitplane.

17. The method according to claim 16, wherein only bits of said corresponding bit sequence above a predetermine minimum bit level are output in said coded representation.

18. The method according to claim 8, wherein, in step (c), steps (a) and (b) are repeated otherwise until each bitplane of said selected region has been scanned.

19. The method according to claim 18, wherein each bitplane of said selected region above a minimum bit level has been scanned.

20. A method according to claim 1, wherein said encoding of high frequency subbands comprises for each subband, selecting said subband as an initial region and performing the following sub-steps of:
(a) checking if a current bit level of the selected region is significant;
(b) if said current bit level is significant, outputting a first token in a coded representation and partitioning said selected region into a number of equally sized sub-regions, wherein each sub-region is processed as said selected region in turn:
(c) if said current bit level is insignificant, outputting a second token in said coded representation and selecting the next lower bit level of said selected region as said current bit level;
(d) repeating steps (a) to (c) until said current bit level is less than a specified minimum bit level, or said selected region has a predetermined size and coefficients of said selected region are coded in said coded representation.

21. The method according to claim 20, wherein said coefficients of said selected region are coded by representing each coefficient by the bits between the corresponding current bit level and the minimum bit level.

22. The method according to claim 20, wherein said transform comprises a discrete wavelet transform.

23. A method according to claim 1, wherein the decomposing of said corresponding values comprises:
a) dividing the digital image into a plurality of blocks;
b) applying a subband transform to each of said blocks to provide a plurality of AC subband regions, at one or more resolutions, and a DC subband region for each block; and
said encoding of the at least one higher frequency component comprises the steps of:
c) selecting said DC subband region as a selected region and performing the following sub-steps:
ca) checking if a current bitplane of the selected region is significant;
cb) if said current bitplane is significant, outputting a first token in a coded representation and partitioning said selected region into a number of sub-regions, wherein each sob-region is processed as the selected region in turn;
cc) if said current bitplane is insignificant, outputting a second token in the coded representation and selecting the next lower bitplane of the selected region as the current bitplane;
cd) repeating sub-steps ca) to cc) until said current bitplane is less than a specified minimum bitplane, or said selected region has a predetermined size and coefficients of said selected region are coded in said coded representation;
d) selecting substantially all uncoded AC subband regions as a remaining region of each block and scanning the significance of each bitplane of the remaining region from a most significant bitplane towards a least significant bitplane, and outputting the second token for each insignificant bitplane until a significant bitplane is determined;
e) setting one or more AC subband regions, of a current resolution level, as a selected region and performing the sub-steps ca) to cd);
f) repeating step e) until substantially all AC subbands of the current resolution level have been encoded; and
g) repeating steps d) to f) until all AC subbands of each block have been encoded.

24. A method according to claim 1, wherein said digital image comprises pixels represented in primary color (RGB) format; and wherein:
prior to the decomposing step the method comprises a further step of:
converting said pixels from said RGB format to Luminance, Chrominance-Blue, Chrominance-Red (YCbCr) component format; and wherein:
said decomposing step comprises decomposing using the non-integer based discrete wavelet transform each component of said YCbCr format of the digital image into a DC subband and a plurality of higher frequency subbands; and wherein:
after said decomposing step and prior to said encoding step for the DC subband, the method comprises a further step of:
converting said DC subband into RGB format; and wherein:
said encoding step for the DC subband comprises encoding into the bit stream said converted DC subband for each primary color as a substantially uncompressed raw bitmap image.

25. A method according to claim 24, wherein components values of the Chrominance-blue and Chrominance-red values are sub-sampled.

26. A method according to claim 24, wherein said uncompressed image has the YCbCr color format and said DC subband, when extracted from said bit stream is converted to RGB format for display of said DC subband being a thumbnail of said digital image.

27. A method of compressing a color digital image, the method comprising the steps of:
decomposing each color component of pixels of the digital image into a DC subband and a plurality of higher frequency subbands, using non-integer based processing;
encoding into a bit stream the DC subband for each component as a substantially uncompressed raw bitmap image, wherein coefficients of the DC subband are contiguously ordered in the bit stream; and
encoding into the bit stream the plurality of high frequency subbands as a compressed bitmap image.

28. The method according to claim 27, wherein said decomposing includes applying a discrete wavelet transform and said encoding of the plurality of higher frequency components utilizes one of at least arithmetic coding and baseline JPEG coding.

29. A method according to claim 27, wherein said digital image comprises pixels represented in primary color red, green and blue (RGB) format; and wherein:

prior to said decomposing step, the method comprises a further step of:

converting R, G and B components of said pixels from said RGB format to components in Luminance, Chrominance-Blue, Chrominance-Red (YCbCr) format, said converting including sub-sampling of the Cb and Cr components; and wherein said decomposing step comprises:

decomposing using non-integer based processing each YCbCr component of said pixels of the digital image into a DC subband and a plurality of higher frequency subbands.

30. A method of compressing a digital image, said digital image comprising pixels represented in primary color (RGB) format, said method comprising the steps of:

converting said pixels from said RGB format to Luminance, Chrominance-Blue, Chrominance-Red (YCbCr) component format;

decomposing using a non-integer based discrete wavelet transform each component of said YCbCr format of the digital image into a DC subband and a plurality of higher frequency subbands;

converting said DC subband into RGB format;

encoding into a bit stream said converted DC subband for each primary colour as a substantially uncompressed raw bitmap image; and encoding into said bit stream the plurality of high frequency subbands as a compressed bitmap image.

31. The method according to claim 30, wherein said converting the RGB format to Luminance, Chrominance-Blue, Chrominance-Red (Y,Cb,Cr) component format comprises sub-sampling of the Cb and Cr components.

32. The method according to claim 30, wherein encoding of high frequency subbands substantially utilizes arithmetic coding.

33. The method according to claim 30, wherein said encoding of high frequency subbands substantially utilizes a baseline JPEG technique.

34. A method according to claim 30, wherein said converting said DC subband into RGB format comprises quantizing the DC subband.

35. A method according to claim 34, wherein said DC subband is quantized to 8 bits of data for each of the R,G and B colors.

36. An apparatus for compressing a color digital image, said apparatus comprising:

a decomposer, arranged to apply a transform to color values of the digital image to decompose the digital image into a DC subband and one or more higher frequency subbands;

an outputter, arranged to output to the bit stream the DC subband in a substantially uncompressed raw bitmap image format, wherein coefficients of the DC subband are contiguously ordered in the bit stream; and an encoder, arranged to encode at least one of the one or more higher frequency subbands into the bit stream in a substantially compressed format.

37. An apparatus according to claim 36, wherein said transform is a non-integer based discrete wavelet transform and the coefficients of said DC subband are quantized at one of each level of transform, or on completion of a final level of transform.

38. An apparatus according to claim 36, wherein said uncompressed format includes a grey scale raw bitmap image format.

39. An apparatus according to claim 36, wherein said uncompressed format corresponds to an RGB color format.

40. An apparatus according to claim 36, wherein said color digital image uses a Red, Green, Blue (RGB) raw bitmap image format.

41. An apparatus according to claim 36, wherein said color digital image uses a Cyan, Magenta, Yellow (CMY) raw bitmap image format.

42. An apparatus according to claim 36, wherein said digital image comprises pixels represented in primary color (RGB) format; and wherein:

said apparatus further comprises a converter adapted for converting, prior to the decomposing step, said pixels from said RGB format to Luminance, Chrominance-Blue, Chrominance-Red (YCbCr) component format; and wherein:

said decomposer is adapted for applying said transform to said corresponding values to thereby decompose said digital image into said DC subband and said one or more higher frequency subbands.

43. An apparatus according to claim 42, wherein said converter comprises a sub-sampler for sub-sampling Chrominance-blue and Chrominance-red values.

44. An apparatus according to claim 42, wherein said uncompressed format is the YCbCr color format and said DC subband, when extracted from said bit stream is converted to RGB format for display of said DC subband being a thumbnail of said digital image.

45. An apparatus for compressing a digital image, said digital image comprising pixels represented in primary color (RGB) format, said method comprising the steps of:

first means for converting said pixels from said RGB format to Luminance, Chrominance-Blue, Chrominance-Red (YCbCr) component format;

second means for decomposing using a non-integer based discrete wavelet transform each component of said YCbCr format of the digital image into a DC subband and a plurality of higher frequency subbands, said second means quantizing coefficients of said DC subband with each level of transform;

third means for converting said DC subband into RGB format;

fourth means for encoding into a bit stream said converted DC subband for each primary color as a substantially uncompressed raw bitmap image; and fifth means for encoding into said bit stream the plurality of high frequency subbands as a compressed bitmap image.

46. An apparatus according to claim 45, wherein said first means is configured to sub-sample the Cb and Cr components.

47. An apparatus according to claim 45, wherein said fourth means uses arithmetic coding.

48. An apparatus according to claim 45, wherein said fourth means uses baseline JPEG coding.

49. A computer software system for representing a digital image to provide a coded representation, said software system comprising a set of instructions executable on a digital computer, wherein said set of instructions comprises modules for implementing the method steps according to claim 1.

50. A computer readable medium having recorded thereon a computer program for compressing a color digital image, the computer program including a number of program modules including:
- a first module for applying a transform to color values to decompose the digital image into a DC subband and one or more higher frequency subbands;
- a second module for outputting to the bit stream the DC subband in a substantially uncompressed raw bitmap image format, wherein coefficients of the DC subband are contiguously ordered in the bit stream; and
- a third module for encoding at least one of the one or more higher frequency subbands into the bit stream in a substantially compressed format.

51. A computer readable medium according to claim 50, wherein the computer program recorded thereon further comprises:
- a fourth module for converting input color values of said color digital image from a first color format to corresponding values in a Luminance, Chrominance-blue, Chrominance-red (Y,Cb,Cr) color format; and wherein
- said first module is adapted for applying said transform to corresponding values of said digital image into said DC subband and said one or more higher frequency subbands.

52. A method of providing a thumbnail-size color digital image in a bit stream of a larger size color digital image, said bit stream of the larger digital image being in a compressed format, and comprising a thumbnail size image in a substantially uncompressed format, said method comprising the steps of:
- converting input color values of said larger color image from a first color format to corresponding values in a second color format;
- applying a non-integer based discrete transform to said corresponding values to decompose said larger digital image into a DC subband and one or more higher frequency subbands;
- outputting to said bit stream the DC subband in an uncompressed format, wherein coefficients of said DC subband are contiguously ordered in the bit stream; and
- encoding at least one of said one or more higher frequency subbands into said bit stream in a substantially compressed format, wherein said DC subband represents said thumbnail-size color digital image in said bit stream.

53. A method according to claim 52, wherein said first color format is RGB, and said second color format is Luminance, Chrominance-blue, Chrominance-red (Y,Cb, Cr).

* * * * *

UNITED STATES PATENT AND TRADEMARK OFFICE
CERTIFICATE OF CORRECTION

PATENT NO. : 6,259,819 B1
DATED : April 6, 1998
INVENTOR(S) : James Philip Andrew et al.

It is certified that error appears in the above-identified patent and that said Letters Patent is hereby corrected as shown below:

Column 1,
Line 10, "pressed" should read -- compressed --.

Column 2,
Line 54, "dig" should read -- digital --;
Line 61, "is" should be deleted; and
Line 65, "tee convened" should read -- the converted --.

Column 3,
Line 2, "image" should read -- image. --;
Line 24, "YChCr" should read -- YCbCr --; and
Line 35, "He" should read -- the --.

Column 4,
Line 15, "taw" should read -- raw --;
Line 21, "require" should read -- required --;
Line 42, "decomposition." should read -- decomposition; --; and
Line 60, "HR2," should read -- HH2, --.

Column 5,
Line 6, "have" should read -- having --;
Line 16, "transfrorm," should read -- transform, --; and
Line 40, "tan" should read -- than --.

Column 6,
Line 11, "σ" should be deleted; and
Line 59, "ROB" should read -- RGB --.

Column 7,
Line 38, "computer," should read -- computer --;
Line 45, "include" should read -- includes --; and
Line 48, "interface," should read -- interface --.

Column 8,
Line 2, "perform" should read -- performed --;
Line 3, "quickley" should read -- quickly --; and
Line 15, "cient" should read -- cient. --.

UNITED STATES PATENT AND TRADEMARK OFFICE
CERTIFICATE OF CORRECTION

PATENT NO. : 6,259,819 B1
DATED : April 6, 1998
INVENTOR(S) : James Philip Andrew et al.

It is certified that error appears in the above-identified patent and that said Letters Patent is hereby corrected as shown below:

Column 10,
Line 34, "so" should read -- size --;
Line 53, "(ICT)" should read -- (DCT) --; and
Line 62, "be" should be deleted.

Column 11,
Line 18, "rough" should read -- through --; and
Line 32, "is" should be deleted.

Column 12,
Line 21, "at" should read -- the --.

Column 13,
Line 11, "a" should read -- 0 --;
Line 12, "The" should read -- the --;
Line 22, "(preferably." should read -- (preferably, --;
Line 36, "its" should be deleted.
Line 43, "(currentBitNumber." should read -- (currentBitNumber, --; and
Line 49, "output" should read -- outputting --.

Column 14,
Line 19, "it" should read -- if --.

Column 15,
Line 12, "currentBitNumber = 7." should read -- currentBitNumber = 7, --.;
Line 41, "13" should read -- -13 --;
Line 59, "hit" should read -- bit --;
Line 60, "BitNumber 3," should read -- BitNumber = 3, --; and
Line 63, "1I" should read -- 1, --.

Column 16,
Line 50, "sew" should read -- set --; and "he" should read -- the --.

UNITED STATES PATENT AND TRADEMARK OFFICE
CERTIFICATE OF CORRECTION

PATENT NO.    : 6,259,819 B1
DATED         : April 6, 1998
INVENTOR(S)   : James Philip Andrew et al.

It is certified that error appears in the above-identified patent and that said Letters Patent is hereby corrected as shown below:

Column 17,
Line 26, "ROB" should read -- RGB --;
Line 47, "requited" should read -- required. --.

Column 18,
Line 4, "1009" should read -- 1008 --;
Line 17, "calling," should read -- calling --; and
Line 36, "(no)." should read -- (no), --.

Column 19,
Line 2, "sub-block," should read -- sub-blocks, --;
Line 26, "(HR)" should read -- (HH) --; and
Line 40, "Fe" should read -- the --.

Column 20,
Line 42, "biplane" should read -- bitplane --; and
Line 61, "in" should be deleted.

Column 21,
Line 12, "predetermine" should read -- predetermined --;
Line 15, "arc" should read -- are --; and
Line 62, "sob-region" should read -- sub-region --.

Signed and Sealed this

First Day of October, 2002

*Attest:*

*Attesting Officer*

JAMES E. ROGAN
*Director of the United States Patent and Trademark Office*